T. HALL.
Lamp Burner.

No. 58,097.

Patented Sept. 18, 1866.

Witnesses:
W. H. Yeager
George B. Buul

Inventor.
Thos. Hall

UNITED STATES PATENT OFFICE.

THOMAS HALL, OF BERGEN, NEW JERSEY.

IMPROVEMENT IN LAMP-BURNERS.

Specification forming part of Letters Patent No. 58,097, dated September 18, 1866.

*To all whom it may concern:*

Be it known that I, THOMAS HALL, of Bergen, county of Hudson, State of New Jersey, have invented a new and useful Improvement in Lamps; and I do hereby declare that the following is a full, clear, and exact description of the construction and operation of the same, reference being had to the annexed drawings, making a part of this specification.

Figure 1:
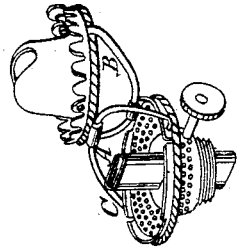

This improvement consists in so arranging the deflecting-cone and chimney-holder of a lamp that said cone and chimney-holder can be moved from off the lower part of the burner (containing the wick-tube) a sufficient distance to light and trim the lamp with ease, as shown in Figure 1.

Figure 2:
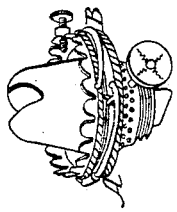

The peculiarity consists in two double-hinged connections, A and B, Fig. 1. These connections are formed of curved pieces of metal, so arranged that when the burner is closed the curved pieces or wires fit close around the burner, as shown in Fig. 2, either outside or inside of rim of burner, as may be desired.

The arrangement is such that the chimney is at all times parallel with its position when in use—that is, perpendicular—by having the length of the connections equal, or nearly equal, to each other.

The stop C, Fig. 1, is to prevent the chimney from being thrown too far from the center of the lamp or burner, and to enable the connecting-wires to bear the weight of the chimney, &c., with more ease.

I am aware of the Patent (No. 42,045) of Mr. Cross, and do not claim the arrangement as used by him, but only the combination as described in this specification.

What I claim, and desire to secure by Letters Patent, is—

The connections A and B and stop C, substantially as described, for the purposes set forth.

THOS. HALL.

Witnesses:
W. H. YEAGER,
GEORGE B. BURLL.